(12) United States Patent
Brueck et al.

(10) Patent No.: US 6,385,377 B1
(45) Date of Patent: *May 7, 2002

(54) TECHNIQUE FOR FABRICATION OF A POLED ELECTRO-OPTIC FIBER SEGMENT

(75) Inventors: Steven R. J. Brueck; Xiang-Cun Long; Ravinder K. Jain, all of Albuquerque, NM (US)

(73) Assignee: University of New Mexico, Albuquerque, NM (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/541,021

(22) Filed: Mar. 31, 2000

Related U.S. Application Data

(62) Division of application No. 09/029,976, filed on Aug. 3, 1998, now Pat. No. 6,097,867.

(51) Int. Cl.⁷ .............................. G02F 1/365
(52) U.S. Cl. ................ 385/122; 359/332; 385/12; 385/14
(58) Field of Search ................ 359/326–332; 385/14, 37, 122, 123, 129, 1, 12; 65/425, 429, 430

(56) References Cited

U.S. PATENT DOCUMENTS

| | | | |
|---|---|---|---|
| 4,929,050 A | * 5/1990 | Wilson | 385/12 X |
| 4,971,416 A | * 11/1990 | Khanarian et al. | 359/332 X |
| 5,039,186 A | * 8/1991 | Man et al. | 385/122 |
| 5,076,658 A | * 12/1991 | Hayden et al. | 385/1 |
| 5,127,928 A | * 7/1992 | Farries et al. | 65/425 X |
| 5,239,407 A | * 8/1993 | Brueck et al. | 359/326 |
| 5,247,601 A | * 9/1993 | Myers et al. | 385/122 |
| 5,351,324 A | * 9/1994 | Forman | 385/37 |
| 5,481,636 A | * 1/1996 | Fukuda et al. | 385/122 |
| 5,617,499 A | * 4/1997 | Brueck et al. | 385/122 |
| 6,097,867 A | * 8/2000 | Brueck et al. | 385/122 |

FOREIGN PATENT DOCUMENTS

| | | | |
|---|---|---|---|
| DE | 4005557 A1 | * 8/1991 | 385/123 |
| JP | 60-14222 | * 1/1985 | 385/122 |
| JP | 4-338734 | * 11/1992 | 385/122 |

OTHER PUBLICATIONS

Pruneri et al, "Frequency Doubling of Picosecond Pulses in Periodically Poled D–Shape Silica Fibre", Electronics Letters, vol. 33, No. 4, Feb. 13, 1997, pp. 318–319.*

Pruneri et al, "Poled Glass Optical Communication Devices", ECOC97, Conference Publication No. 448, Sep. 22–25, 1997, pp. 103–106.*

Fujiwara et al, "Electro–optic modulation in germanosilicate fibre with UV–excited poling", Electronics Letters, vol. 31, No. 7, Mar. 30, 1995, pp. 573–575.*

* cited by examiner

*Primary Examiner*—John D. Lee
(74) *Attorney, Agent, or Firm*—Jagtiani + Guttag

(57) ABSTRACT

The present invention provides a method of fabricating an electro-optically active fiber segment comprising the steps, in any order, of inducing a second-order nonlinearity in the fiber segment, and placing a portion of the fiber segment between and in contact with two electrodes. Also, the present invention provides an electro-optically active fiber segment comprising a second-order nonlinearity induced within the fiber segment, and a portion of the fiber segment being between and in contact with a first electrode and a second electrode.

19 Claims, 3 Drawing Sheets

TECHNIQUE FOR FABRICATION OF A POLED ELECTRO-OPTIC FIBER SEGMENT

CROSS-REFERENCE TO RELATED APPLICATIONS

This application is a divisional of U.S. application Ser. No. 09/029,976, entitled "Technique for Fabrication of a Poled Electro-Optic Fiber Segment," filed on Aug. 3, 1998, now U.S. Pat. No. 6,097,867. The entire contents and disclosure of the above-mentioned application and patent is hereby incorporated by reference.

BACKGROUND OF THE INVENTION

1. Field of the Invention

This invention relates to a method for the fabrication of electrooptically active fiber segments that can be readily integrated into optical fiber lines, with applications in high-speed modulators, electric field sensors, or optical mixers.

2. Description of the Related Art

This invention is related to U.S. Pat. No. 5,239,407, Method and Apparatus for Creating Large Second-Order Nonlinearities in Fused Silica and U.S. Pat. No. 5,247,601, Arrangement for Producing Large Second-Order Optical Nonlinearities in a Waveguide Structure including Amorphous $SiO_2$. These patents are hereby incorporated by reference.

Packaging costs associated with opto-mechanical coupling of discrete optical components are a major part of the cost for advanced optoelectronic systems. For example, for many high-speed fiber communications systems, the output of a diode laser must be coupled into a single-mode optical fiber, the fiber must then be coupled to a $LiNbO_3$ waveguide modulator whose output is again coupled into a fiber. Discrete optical components, e.g., graded-index lenses or micro-lenses are required at each coupling node to adapt the very different mode profiles and spatial extents of the diode laser and modulator waveguide modes to the fiber mode. Tolerances are fractions of a micrometer to ensure minimal coupling losses and extensive active alignment (optimizing coupling with the laser on) is typically required. Throughput and yield are both limited by the requirement of keeping the system stable while the bonding agents cure. If a modulator could be produced that was integrated into the fiber, the manufacturing and packaging costs associated with these high-speed fiber communications systems would be substantially reduced.

Electric field sensors are another potentially attractive application of electrooptically active fibers. The electric power industry has a need for remote sensors to monitor high voltage power systems. Integrating electrooptically active fiber sensors with Bragg reflector gratings is a very attractive alternative to currently available sensors that will have a major economic impact.

A third potential area of application of electrooptically active fibers is frequency mixing (i.e., second harmonic and sum frequency generation to reach shorter wavelengths than the starting wavelengths and difference frequency generation to reach longer wavelengths). This would enable the extension of the utility of high power diode lasers which are today confined to the wavelength range from roughly 700 nm to 1 micrometer. Applications include high-density optical recording, displays, and spectroscopic sensors. These nonlinear mixing processes require both a second-order nonlinearity, the same order nonlinearity that gives rise to the electrooptic effect, as well as a phase matching technique to ensure that the nonlinear mixing stays coherent along the active length of the fiber. Previous work (X.-C. Long, R. A. Myers and S. R. J. Brueck, *Measurement of the linear electrooptic coefficient in poled amorphous silica,* Optic Letters 19, 1820 (1994); X.-C. Long, R. A. Myers and S. R. J. Brueck, *Measurement of linear electrooptic effect in temperature/electric-field poled optical fibers,* Electronics Letters 30, 2162 (1994)) has shown that the second-order nonlinearity and the electrooptic effect induced in germano-silicate glasses arise from the same electronic processes and are closely related. The required phase matching is most conveniently achieved by quasi-phase matching in which the nonlinearity is alternately turned on and off each coherence length (i.e., the length over which the phases of the fundamental and second harmonic fields are shifted by $\pi$ because of their different velocities). More complex poling patterns may be desirable to tailor the phase matching bandwidth for specific applications.

There has been extensive work on integral fiber lasers involving doping the fiber with an appropriate chromophore (typically a rare earth element such as Er for the important 1.55-$\mu$m telecommunications band) and integrating mirrors onto the fiber either by polishing and coating the fiber ends or by using photogenerated gratings. (See K. O. Hill, B. Maio, F. Bilodeau and D. C. Johnson, *Photosensitivity in Optical Fibers,* in Annual Review of Materials Science, Vol. 23, pp. 125–157, R. A. Laudise and E. Snitzer, eds. (Annual Reviews, Palo Alto; 1993) for a recent review of photogenerated gratings and their application to fiber lasers.) These fiber lasers cannot be modulated at communications rates (Mb/s–Gb/s) by turning the pumping beam on and off because of the inherent long lifetimes of the dopants (typically ~ms). Hence an external modulator is essential for communication applications, a modulator internal to the cavity can be used for Q-switching and mode-locking of the laser output to produce short, high power pulses.

Clearly, integration of the modulator into a fiber that can simply be spliced onto the laser fiber in a simple, inexpensive, rapid process would be the optimal packaging solution. Such a high-speed modulator integrated into a fiber is a very important element that has yet to be realized. The discovery by our group at the University of New Mexico of a stable second-order nonlinearity induced in $SiO_2$ materials has led to a great deal of work aimed at establishing a practical geometry for both waveguide (U.S. Pat. No. 5,247,601) and fiber modulators (see X.-C. Long, et al and P. G. Kazansky, P. St. J. Russell, L. Dong and C. N. Pannell, *Pockels effect in thermally poled silica optical fibers,* Electronics Letters 31, 62 (1995)).

Recently, a group at the Australian Fiber Optic Research Center has demonstrated (T. Fujiwara, et al, *Electrooptic modulation in germanosilicate fibre with UV-excited poling,* Electronics Letters 31, 573 Mar. 30, 1995) a significant improvement in the effective electrooptic coefficient of a fiber with two innovations: a) use of an ultraviolet beam along with an applied electric field to produce the poling in contrast to the use of high temperatures (~100–300° C.) under an applied electric field, and b) provision for wire electrodes internal to the fiber to increase resistance to breakdown during the poling and to provide a better overlap between the nonlinearity and the optical mode volume. They were able to achieve an electrooptic (r) coefficient of 6 pm/V. This is significantly larger than previously reported (0.05 pm/V) and is sufficiently large for practical application. Their technique, however, has a number of drawbacks. Specifically, the fiber is drawn from a preform with two holes for electrode wires that are to be inserted following the fiber drawing. This wire insertion is a difficult manufacturing step, comparable to the difficulty and expense of coupling discrete optical components. To avoid breakdown, one wire is inserted from each end of the fiber. This means that the modulation frequency is limited to low values since a high-speed traveling wave geometry is not possible. Furthermore, splicing to either end of the fiber is not possible because of the electrodes again requiring discrete optical system alignment for coupling into the fibers, negating much of the advantage of an electrooptically active fiber segment—the fabrication of an all-fiber active device.

Clearly, there is a need for an electrooptically active fiber segment that can be simply spliced with other fiber components onto a laser fiber to significantly reduce the manufacturing and packaging costs.

SUMMARY

In accordance with the present invention, a electrooptically active fiber segment is fabricated using a "D" fiber where one side of the cladding has been removed close to the core. This flat side of the fiber is glued to a substrate which has been made suitably conductive to form one of the device electrodes. The fiber ends extent beyond the substrate for subsequent fiber splicing. A thick layer of dielectric is deposited on the substrate, and the fiber/dielectric structure is polished to provide a planar surface and close access to the fiber core on the side of the fiber opposite to the flat portion of the "D." This dielectric layer also provides electrical isolation so that large voltages can be applied across the fiber core in the poling process. A second electrode is deposited on top of the polished surface, forming a stripline to allow high-speed rf propagation. Temperature/electric field poling of the composite structure creates a second-order nonlinearity in the fiber enabling modulation of a propagating laser beam by an electromagnetic signal. Alternately, electric fields can be applied along with appropriate UV irradiation to form the nonlinearity, or a combination including temperature programming along with UV irradiation can be used. A second dielectric layer followed by a blanket metal film may be added for additional rf isolation.

BRIEF DESCRIPTION OF THE DRAWINGS

Reference is now made to the drawings in which.

DETAILED DESCRIPTION OF THE INVENTION

Figure 1:
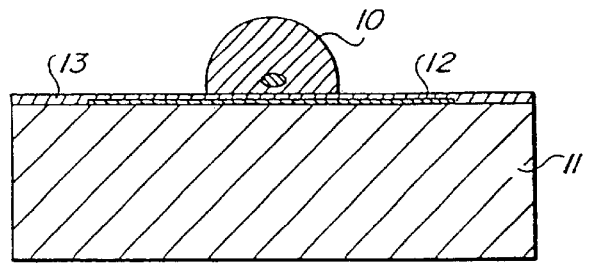
FIG. 1 illustrates the steps involved in the fabrication of an electrooptically active fiber segment.
Figure 1:
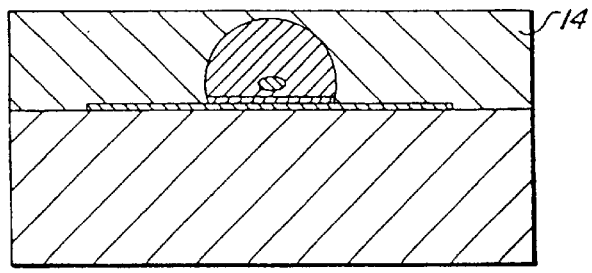
Figure 1:
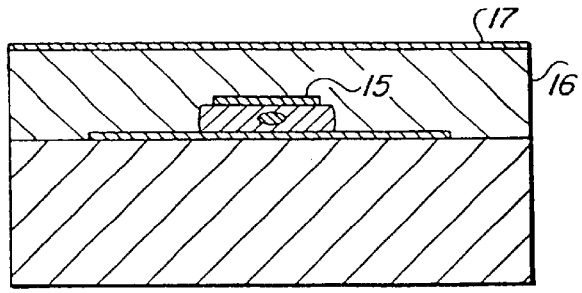
Figure 1:
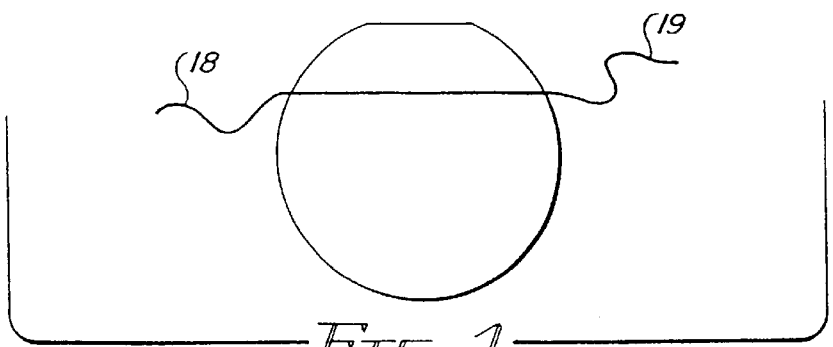

We have developed a fabrication technology that addresses the manufacturing and packaging difficulties raised by previous fabrication methods. The technique is illustrated in FIG. 1. We start with a "D" fiber 10 where one side of the cladding has been polished close to the core. Typically, this done in the preform before the fiber is pulled. Such "D" fibers are well known and readily available commercially. The flat section of the "D" fiber may be further etched or polished to allow closer approach of the electrode structure to the fiber core. There is an important tradeoff between the proximity of the electrode to the core allowing a larger electrooptic coefficient and at the same time increasing the linear optical loss of the fiber segment. The optimal distance from the electrode to the core must be established as part of a detailed device engineering. The steps in the fabrication process are next enumerated.

(1) The fiber is glued to a flat substrate 11 (typically, but not necessarily Si) with the flat side down. The substrate may be metalized 12 to provide one of the device electrodes before the gluing. We have used a thin polyimide layer as the glue 13; other materials are possible. The fiber ends are kept away from the planar surface so that they will be available subsequent to the processing for fiber splicing.

(2) A thicker layer of polyimide 14 is deposited to both fix the fiber position and provide a dielectric material so that high electric fields can later be applied across the fiber. (again other materials may be used, the requirement is a high dielectric breakdown strength and tolerance to either thermal poling temperatures (~200–300° C.) or to UV-irradiation for poling.

(3) The fiber/polyimide structure is polished to provide a planar surface and close access to the fiber core on the side of the fiber opposite to the "D."

(4) A second electrode 15 is deposited on top of the polished surface. This electrode can be designed in concert with the substrate as a stripline to allow high-speed rf propagation. The electrode can be deposited at an angle to the fiber in a serpentine arrangement to match the rf and optical velocities.

(5) Temperature/electric field poling of the composite structure is performed to create the second-order nonlinearity in the fiber. (Alternatively, UV poling can be used with an appropriate electrode design, partially transmitting electrodes, apertured electrodes, etc. to allow optical access to the fiber core.). For frequency mixing applications, where quasi-phase matching is required, an appropriately patterned electrode structure may be used.

(6) A second dielectric 16 layer followed by a blanket metal film 17 may be added for additional rf isolation. Depending on processing considerations this step may occur before or after step 5.

(7) The ends of the fiber 18, 19 may now be spliced to additional fiber lengths.

This technology provides: (a) a high-speed rf circuit allowing traveling wave interactions between the rf and optical fields and hence a high speed modulation capability; (b) inexpensive optical packaging by simple splices at both ends of the fiber; and (c) extensibility to simultaneous manufacture of multiple poled fiber, electrooptically active sections.

Figure 2:
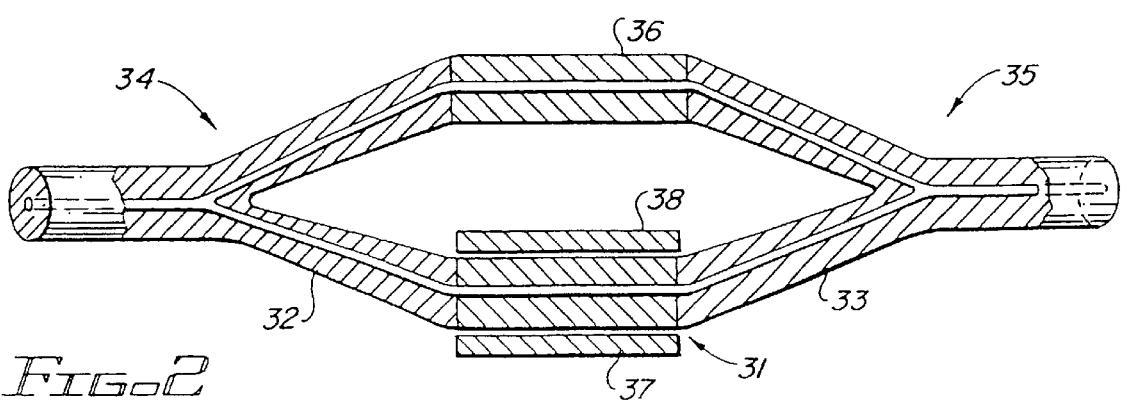
FIG. 2 shows an all-fiber Mach-Zehnder modulator incorporating an electrooptically active fiber segment.

These may now be used in any of the applications cited in the background section. Specifically, for a fiber modulator refer to FIG. 2. Where the electrooptically active fiber section 31 is spliced to two additional passive fiber sections 32, 33 which are connected to two 3 dB 2×1 fiber power splitters 34, 35. An additional passive fiber section 36 between the power splitters completes the Mach-Zehnder interferometer. In operation, the phase shift of the optical signal transmitted through the electrooptically active fiber section is modulated by application of an electric field across the electrodes 37, 38. The transmission through the interferometer is a sinusoidal function of the optical phase difference between the two arms of the interferometer. When the two signals are in phase at the output power splitter, the transmission is maximum; when the two signals are π out of phase at the output power splitter, the transmission is zero and all of the power is reflected from the interferometer. Often the passive fiber segment 36 is replaced with a second electrooptically active segment with opposite polarity electric fields applied, reducing the required voltage swing by a factor of two.

Figure 3:
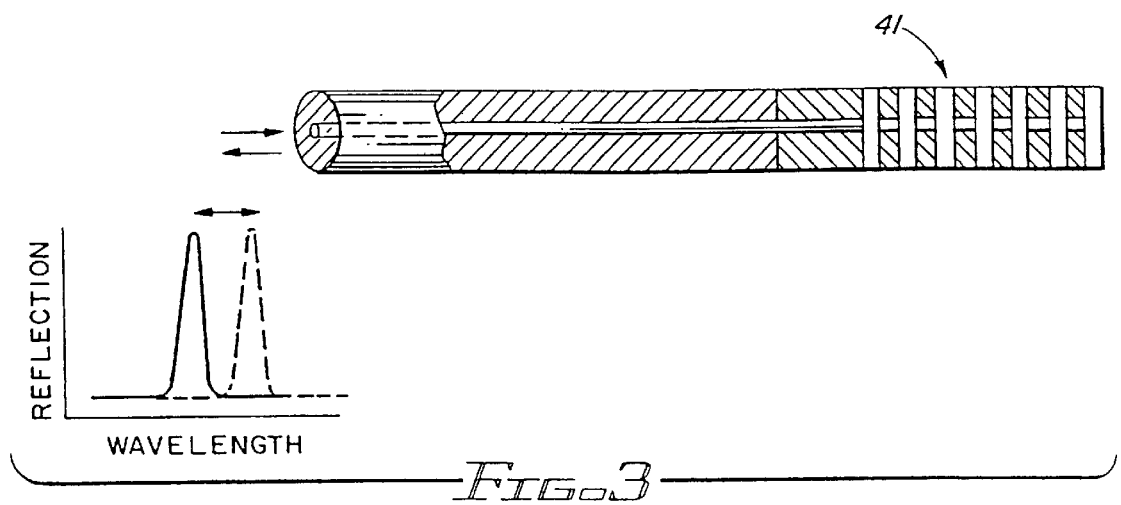
FIG. 3 shows a electric field sensor incorporating an electrooptically active fiber segment along with a Bragg reflection grating in the same fiber segment.

For an electric field sensor, the electrooptically active segment could again be incorporated in an all-fiber integrated Mach-Zehnder interferometer, now with the electrodes 37, 38 removed to allow sensing of the local electric field in the region of the electrooptically active fiber segment. Alternatively as shown in FIG. 3, a Bragg grating 41 could be incorporated in the electrooptically active fiber segment. The Bragg grating is a region of refractive index modulation that reflects light of a certain frequency range and transmits light of other frequency ranges. The specific frequency of minimum transmission can be modified by changing the overall modal index of the fiber by applying an electric field as shown schematically in the inset to the figure. The Bragg grating may be produced by patterned UV-irradiation of the fiber or by any other suitable technique.

Figure 4:
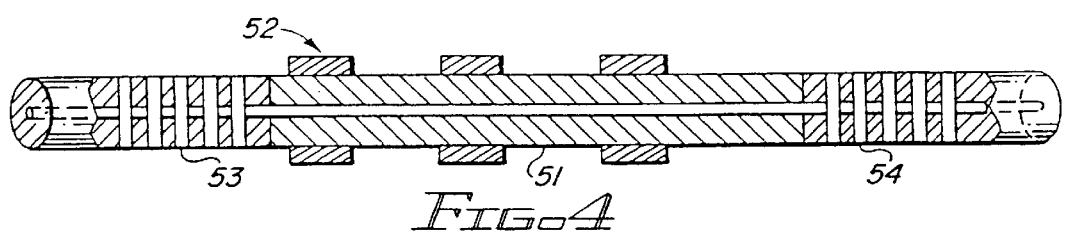
FIG. 4 shows a series of electrooptically active fiber segments arranged in a periodic fashion for three-wave mixing to produce new optical frequencies.

For three wave mixing applications, the electrooptically active fiber segment 51 must be poled in a suitable quasi-phase matched configuration as represented by the segmented electrode structure 52 shown in FIG. 4. Optional Bragg gratings 53, 54 may be placed at either end of the electrooptically active fiber segment to enhance the fields at the fundamental frequencies by forming Fabry-Perot cavities.

Initial demonstrations of this manufacturing technique were carried out using a single mode, polarization-maintaining, germanosilicate D-fiber designed for 633 nm (Andrew Corporation no. 205170-6335-2). The core is 1.25×2.5 $\mu m^2$ with 18 wt % Ge doping, and the thickness of the fused silica cladding is only 9 $\mu m$ on the flat side of the fiber. The total thickness of the core/cladding from the flat to the opposite side of the cladding was 45 $\mu m$. Following stripping of the plastic jacket in sulfuric acid at temperature of 200° C., the fiber was etched in 48% HF solution for 3.5 min. to further reduce the minimum thickness of the cladding (at the "D") from 9 $\mu m$ to about 5 $\mu m$. The linear fiber properties were unchanged by these processing steps. A thin (~1-$\mu m$ thick) layer of polyimide (UR3100) was then spun onto a Si wafer and the fiber was affixed to the wafer "D" side down using this polyimide layer as an adhesive. The polyimide layer was cured with a dual temperature process at 120° C. and 170° C. for 5 minutes each. Subsequent to this curing, multiple additional layers of polyimide (UR3140) were spun onto the wafer until the total thickness reached 40 $\mu m$. Each layer of the polyimide was cured with a dual temperature cycle at 120° C. and 170° C. for 10 minutes each. The total polyimide stack was cured at 350° C. for 1 hour. Then, the fiber/polyimide structure was mechanically polished down to a thickness of ~34 $\mu m$. A Cr:Au film (300 Å/3000 Å) was deposited on top of the polished surface as the second electrode.

Figure 5:
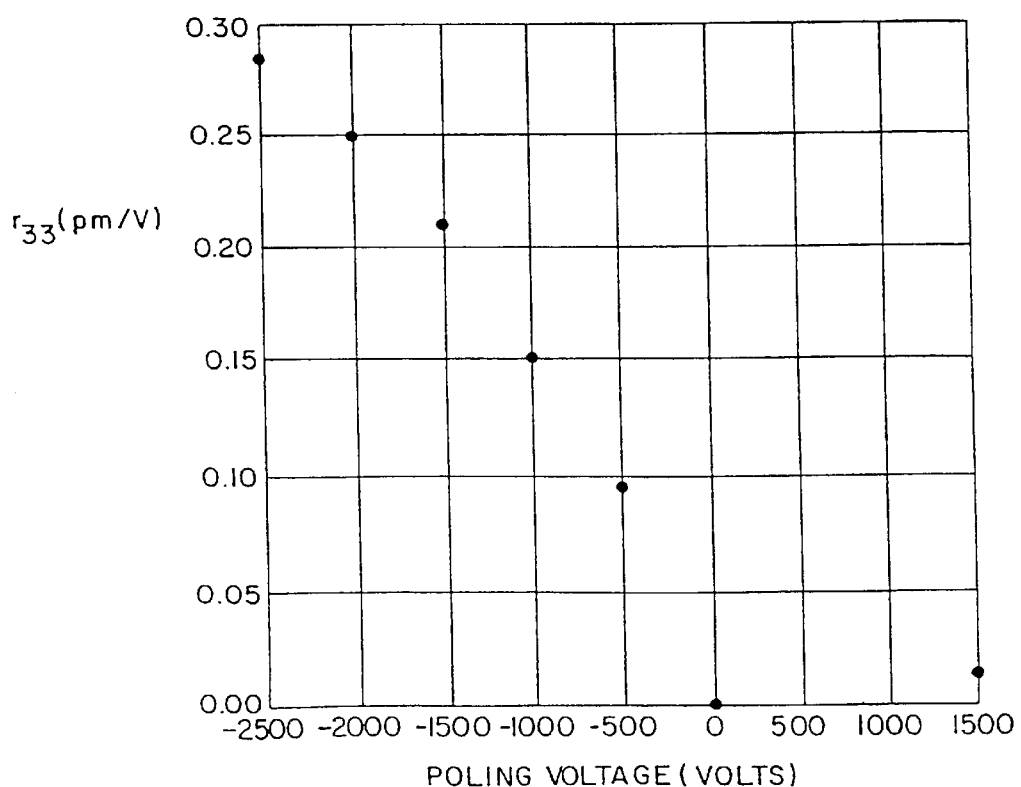
FIG. 5 shows the relationship between the measured electrooptic coefficient and the poling voltage for a fixed poling temperature and a fixed poling time.
Figure 6:
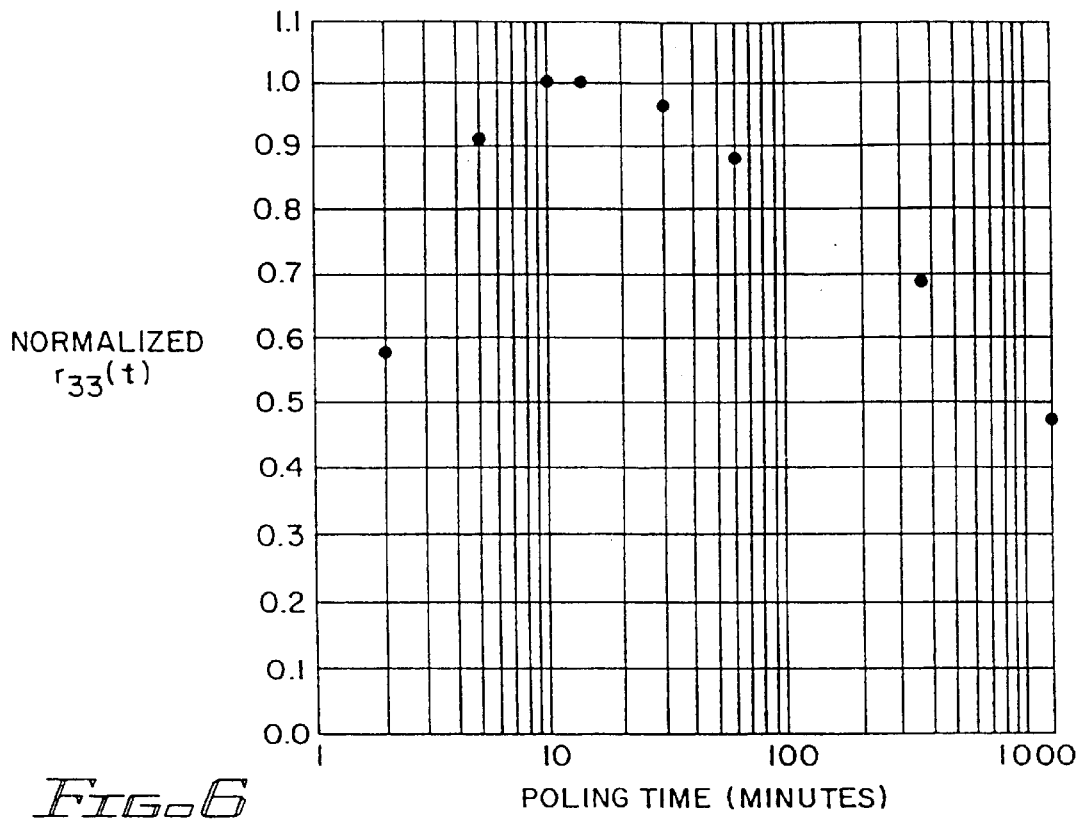
FIG. 6 shows the relationship between the measured electrooptic coefficient vs. the poling time for a fixed poling voltage and temperature.

The resulting structure was poled by electric field/ temperature poling processes over a variety of parameters. To monitor the resulting electrooptic effect, the poled sample was placed in the measurement arm of a Mach-Zehnder interferometer operating at 633 nm. To maintain ease of testing over a variety of poling conditions for these experiments, the Mach-Zehnder was a free space geometry with appropriate microscope objectives to couple light into and out of the electrooptically active fiber section. FIGS. 5 and 6 show the relationship between the measured electrooptic coefficient $r_{33}$ and the poling voltage for a fixed poling temperature of 255° C. and a poling time of 10 minutes and of the electrooptic coefficient $r_{33}$ vs. the poling time for a fixed poling voltage of 1.5 kV and temperature of 255° C. For these experiments the largest coefficient was obtained for a short poling time of only 10 minutes. As expected, the phase shift signal is sensitive to the polarization of input laser light. The ratio of the signal from TE mode to one from TM mode is ~2.4:1. This measurement implies that electrooptic coefficient ratio $r_{33}$:$r_{31}$, is ~2.4:1, roughly consistent with the 3:1 ratio predicted from a simple symmetry model.

Figure 7:
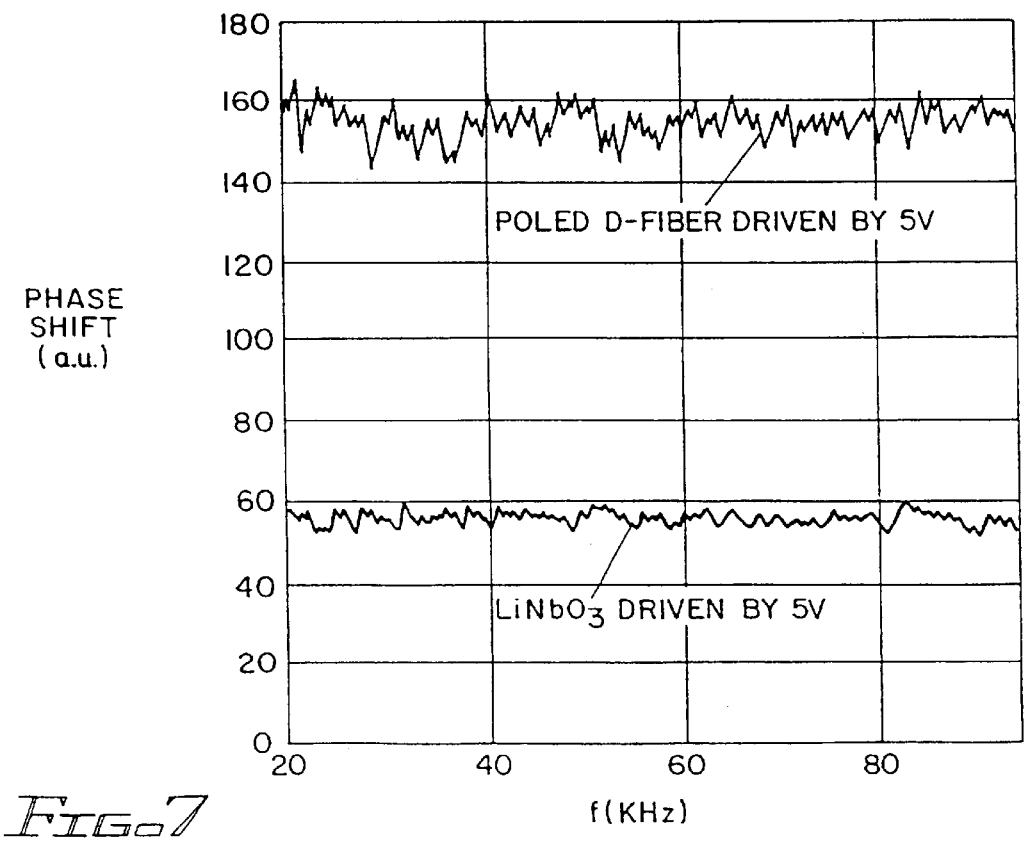
FIG. 7 shows phase shift signals from poled fiber and $LiNbO_3$ samples in a Mach-Zehnder interferometer vs. driving electrical frequency.

The signal shows a smooth frequency response as shown in FIG. 7. The absence of strong narrow acoustic frequency resonances implies that the piezoelectric response has been damped and demonstrates that the signal is due to the electrooptic effect.

In summary, a scaleable, manufacturing technique for producing a large second-order nonlinearity in an optical fiber is disclosed. We have obtained a linear electrooptic coefficient as high as 0.3 pm/V by temperature/electric-field poling a germanosilicate optical fiber using an improved poling geometry. The resulting electrooptically active fiber segment has an inherent high-speed rf capability with provision for velocity matching of rf and optical fields and is adaptable to periodic poling for quasi-phasematched nonlinear interactions. The demonstrated technique is scaleable to volume manufacturing, and is readily packaged with additional fiber components by simple splicing techniques. Major areas of application include: high-speed fiber modulators for telecommunications; electric field sensors for power generation and transmission systems; and extended wavelength generation by sum and difference frequency mixing.

We claim:

1. In optoelectronics, a method of fabricating an electrooptically active fiber segment comprising the steps, in any order of:

inducing a second-order nonlinearity in said fiber segment; and placing a portion of said fiber segment between and in contact with two electrodes.

2. The method recited in claim 1, wherein said inducing step is performed by at least one of a temperature field means, a UV light means, a photon means and an electric field means.

3. The method recited in claim 1, wherein said placing step includes the steps of:

etching a "D" fiber such that the surface of the flat side is close to the core;

gluing said etched "D" fiber to a flat substrate with a conductive surface with the ends of said fiber segment extending beyond the substrate;

depositing a layer of dielectric material on said substrate containing said etched "D" fiber, such that the "D" fiber is substantially covered by said dielectric material;

polishing the fiber/dielectric structure of the prior step to provide a planar surface and close access to the fiber core on the side opposite said substrate; and depositing a metal layer on said planar surface over said fiber, thereby forming an electrode.

4. The method recited in claim 3, wherein said dielectric material is a polyimide.

5. The method recited in claim 3, further comprising the steps of:
   depositing a second dielectric layer on top of said planar surface; and
   depositing a metal film on top of said second dielectric layer, thereby adding additional radio frequency isolation.

6. The method recited in claim 1, further comprising the step of integrating said fiber segment into one arm of a Mach-Zehnder interferometer to create a fiber modulator and induce nonlinearity.

7. The method recited in claim 1, further comprising the step of incorporating a Bragg grating into said fiber segment to create an electric field sensor and induce nonlinearity.

8. The method recited in claim 1, further comprising the step of poling said fiber segment in a quasi-phase matched configuration to create a three wave mixer.

9. The method recited in claim 8, further comprising the step of incorporating a Bragg grating at either end of the electro-optically active fiber segment to induce nonlinearity.

10. The method recited in claim 1, further comprising the step of splicing ends of a fiber containing said fiber segment to conventional fiber lengths.

11. An electro-optically active fiber segment fabricated in accordance with the method of claim 1.

12. An electro-optically active fiber segment comprising:
   a second-order nonlinearity induced within said fiber segment; and
   a portion of said fiber segment being between and in contact with a first electrode and a second electrode.

13. The fiber segment recited in claim 12, wherein said fiber segment is integrated into one arm of a Mach-Zehnder interferometer to create a fiber modulator and induce nonlinearity.

14. The fiber segment recited in claim 12, further comprising a Bragg grating incorporated into said fiber segment to create an electric field sensor and induce nonlinearity.

15. The fiber segment recited in claim 12, further comprising poling said fiber segment in a quasi-phase matched configuration to create a three wave mixer.

16. The fiber segment recited in claim 15, further comprising a Bragg grating disposed at either end of the electro-optically active fiber segment to induce nonlinearity.

17. The fiber segment recited in claim 12, wherein said first electrode is formed from a flat substrate with a metalized layer and a portion of a first side of said fiber segment being attached to said substrate, said portion of said fiber segment having been polished flat on said first side close to the core, and unpolished portions of said fiber segment and fiber containing said fiber segment extending beyond said substrate.

18. The fiber segment recited in claim 17, wherein said second electrode is deposited on a second side of said fiber segment, wherein said second side of said fiber segment has been polished flat close to the core and unpolished portions of said fiber segment and fiber containing said fiber segment extending beyond said substrate.

19. The fiber segment recited in claim 12, wherein said second-order nonlinearity in said fiber segment is created by at least one of a temperature field means, a UV light means, a photon means and an electric field means.

* * * * *